(12) United States Patent
Albornoz

(10) Patent No.: US 12,489,758 B2
(45) Date of Patent: Dec. 2, 2025

(54) ROLES ASSIGNMENT

(71) Applicant: KYOCERA Document Solutions Inc., Osaka (JP)

(72) Inventor: Lorena Andrea Albornoz, Berkeley, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 269 days.

(21) Appl. No.: 18/197,774

(22) Filed: May 16, 2023

(65) Prior Publication Data

US 2024/0388587 A1 Nov. 21, 2024

(51) Int. Cl.
*H04L 9/40* (2022.01)

(52) U.S. Cl.
CPC .......... *H04L 63/104* (2013.01); *H04L 63/101* (2013.01)

(58) Field of Classification Search
CPC ....... H04L 63/104; H04L 63/101; H04L 9/40; G06F 3/04847; G06F 40/18; G06F 40/186
See application file for complete search history.

(56) References Cited

U.S. PATENT DOCUMENTS

| | | | |
|---|---|---|---|
| 7,305,392 B1* | 12/2007 | Abrams | G06Q 10/10 707/999.009 |
| 8,407,250 B2 | 3/2013 | Saha et al. | |
| 8,763,145 B2* | 6/2014 | Mihara | G06F 21/6218 726/26 |
| 10,778,692 B2* | 9/2020 | Demmler | G06F 21/604 |
| 11,451,557 B2* | 9/2022 | Hirokawa | H04L 63/08 |
| 11,481,506 B2 | 10/2022 | Higuchi | |
| 2010/0070522 A1* | 3/2010 | Nazar | G06Q 10/10 715/764 |
| 2013/0117088 A1* | 5/2013 | Madsen | G06Q 30/02 705/14.39 |
| 2015/0135300 A1* | 5/2015 | Ford | G06Q 50/18 726/11 |
| 2024/0339226 A1* | 10/2024 | Lucas | G16H 20/30 |
| 2024/0385739 A1* | 11/2024 | Albornoz | G06F 40/18 |

\* cited by examiner

*Primary Examiner* — Apu M Mofiz
(74) *Attorney, Agent, or Firm* — W. Eric Webostad

(57) ABSTRACT

Systems and methods relating generally to digital content management are disclosed. In one such method, a downloadable template for an application program product is provided to a spreadsheet engine running on a computer. Information of users of the application program product is imported into the template. Roles from a predefined set of the template are assigned. The template is automatically populated with predetermined access rights for each of the roles assigned. Groups are created using the information imported in association with the roles and the access rights therefor.

14 Claims, 12 Drawing Sheets

Display Screen 10

IM Finance Users — Export

| Name | Email | Role 106 | View | Edit | Delete | Trial |
|------|-------|----------|------|------|--------|-------|
| Name1 | Email1 | Admin ▾ (131) | ✓ | ✓ | ✓ | ☐ |
| Name2 | Email2 | Editor ▾ | ✓ | ✓ | ☐ | ☐ |

109

131

Overview | Execs. (111) | Mgrs. | Individuals | +

FIG. 1-3

Display Screen 10

IM Finance Users — Export

| Name | Email | Role 106 | View | Edit | Delete | Trial |
|------|-------|----------|------|------|--------|-------|
| Name1 | Email1 | Viewer ▾ (131) | ✓ | ☐ | ☐ | ☐ |
| Name4 | Email4 | Admin ▾ | ✓ | ☐ | ✓ | ✓ |

109

131

Overview | Execs. | Mgrs. | Individuals (113) | +

FIG. 1-4

IM Finance Users — 150

| Name | Email | Role | View | Edit | Delete | Group(s) |
|---|---|---|---|---|---|---|
| Name1 | Email1 | Admin ▾ | ✓ | ✓ | ✓ | Exec., Indiv. — 301 |
| Name2 | Email2 | Editor ▾ | ✓ | ✓ | | Mgr. |
| Name3 | Email3 | Viewer ▾ | ✓ | | | Indiv. |
| Name4 | Email4 | Admin ▾ | ✓ | ✓ | ✓ | Exec. |

Export

Overview | Execs. | Mgrs. | Indivs. | +

Display Screen 10

300
- Edit user — 302
- Delete user — 303
- Add to group — 304
- Give temporary group access — 305

FIG. 3-1

ROLES ASSIGNMENT

FIELD

The following description relates to an information system. More particularly, the following description relates to assignment of roles in a digital content management system.

BACKGROUND

Generally, conventional enterprise information systems, such as digital document management systems, involve multiple users with different roles for digital document management. There may be a list of users for various purposes, and there may be a list of roles with various access rights to be assigned to such users. Furthermore, there may be a list of different groupings of users for various purposes with varying roles.

SUMMARY

In accordance with one or more below described examples, a method relating generally to a digital content management system is disclosed. In such a method, a downloadable template for an application program product is provided to a spreadsheet engine running on a computer. Information of users of the application program product is imported into the template. Roles from a predefined set of the template are assigned. The template is automatically populated with predetermined access rights for each of the roles assigned. Groups are created using the information imported in association with the roles and the access rights therefor.

In accordance with one or more below described examples, a system relating generally to digital content management is disclosed. In such a system, a computer has: a memory configured to store program code; and a processor coupled to the memory. The memory and the processor n combination and response to executing the program code, the computer is configured to initiate operations for implementing a process for digital content management. The process includes: a downloadable template for an application program product provided to a spreadsheet engine running on a computer. Information of users of the application program product is imported into the template. Roles from a predefined set of the template are assigned. The template is automatically populated with predetermined access rights for each of the roles assigned. Groups are created using the information imported in association with the roles and the access rights therefor.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is block/pictorial diagram depicting an example of a filled-out version of the GUI template of FIG. 1-1.

FIG. 1-3 is a block/pictorial diagram depicting an example of a filled-out version of the GUI template of FIG. 1-2 for an Executives group.

FIG. 1-4 is a block/pictorial diagram depicting an example of a filled-out version of the GUI template of FIG. 1-2 for an Individuals group.

FIG. 1-5 is a block/pictorial diagram depicting an example of a filled-out version of an application program product GUI after upload of the GUI template of FIG. 1-2.

FIG. 2-1 is a flow diagram depicting an example of a workflow for filling out the GUI template of FIG. 1-1.

FIG. 2-2 is a flow diagram depicting an example of an access limitation flow.

FIG. 2-3 is a block diagram depicting an example of a suite of applications in a digital content management system.

FIG. 3-1 is a block/pictorial diagram depicting an example of a GUI of an application program product after invoking an admin menu for group management.

FIG. 3-2 is a block/pictorial diagram depicting an example of a GUI of an application program product after invoking an admin menu for temporary access.

FIG. 3-3 is a block/pictorial diagram depicting an example of a GUI of an application program product after invoking a user menu.

FIG. 4 is a pictorial diagram depicting an example of a network.

FIG. 5 is a block diagram depicting an example of a portable communication device.

DETAILED DESCRIPTION

Figure 1:
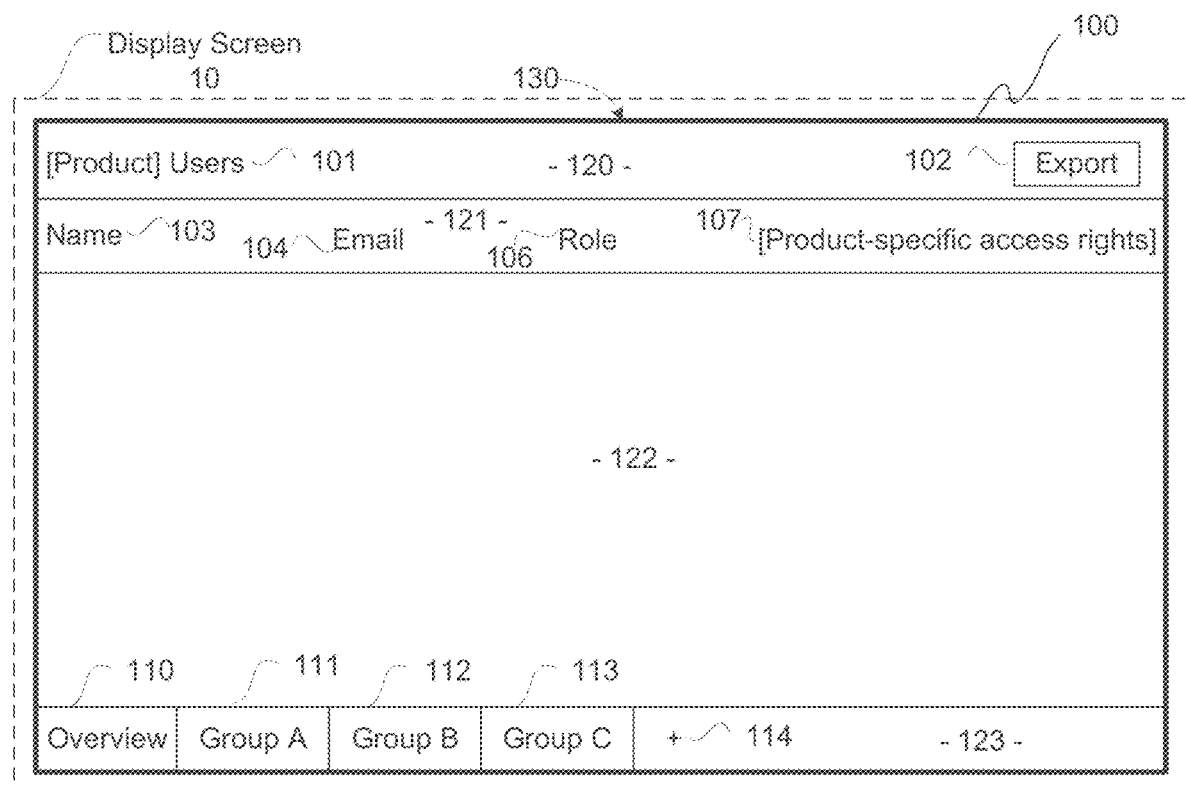
FIG. 1-1 is a block/pictorial diagram depicting an example of a graphical user interface ("GUI") template.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

There may be a list of users for various purposes, and there may be a list of roles with various access rights to be assigned to such users in a digital document management system. Furthermore, there may be a list of different groupings of users for various purposes with varying roles in such a digital document management system. Balancing permissions per user, as well as grouping certain access rights assigned to a role can be complex.

In a prior digital document management system, a checklist table was used to show what access rights a certain group had for a specific product. However, this technique did not give an overview of who is in each group. Another drawback of using a checklist table is that it created a cumbersome work experience by forcing a user to perform multiple steps in creating a group and then having to go back and add access rights to each user in such created group.

As described below in additional detail, a role assignment is provided with group creation for a digital content management system, such as for example a digital document management system among other types of content management systems. This fosters a much easier-to-follow experience that guides a user to create one or more groups and select or edit access rights in one single flow or workflow.

With the above general understanding borne in mind, various configurations for systems, and methods therefor, for roles assignment for a digital content management system are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a block/pictorial diagram depicting an example of a graphical user interface ("GUI") template 100. GUI template 100 may be displayed on a conventional display screen 10. When first opened, user list area 122 of GUI template 100 may be blank; however, GUI template 100 is configured to provide a data structure, as described below in additional detail.

In this example, GUI template 100 has a window 130 having a title bar 120, a headings bar 121, a user list area 122, and a group list area 123. In this example, title bar 121 includes a product name in front of "Users" 101 and an export button 102. A product name may be auto populated or customized by input into a field for it and displayed in front of Users 101, as described below in additional detail. Export button 102 may be selected to export data contents of a window 130.

In this example, headings bar 121 includes the following column headings: "Name" 103, "Email" 104, "Role" 106, and a region for headings for product-specific access rights columns 107. In this example, user list area 122 includes an area for columns for one or names and one or more corresponding emails. These name and email columns may correspond to a column of roles 108, as well as corresponding columns of access rights.

Figures 1, 2:
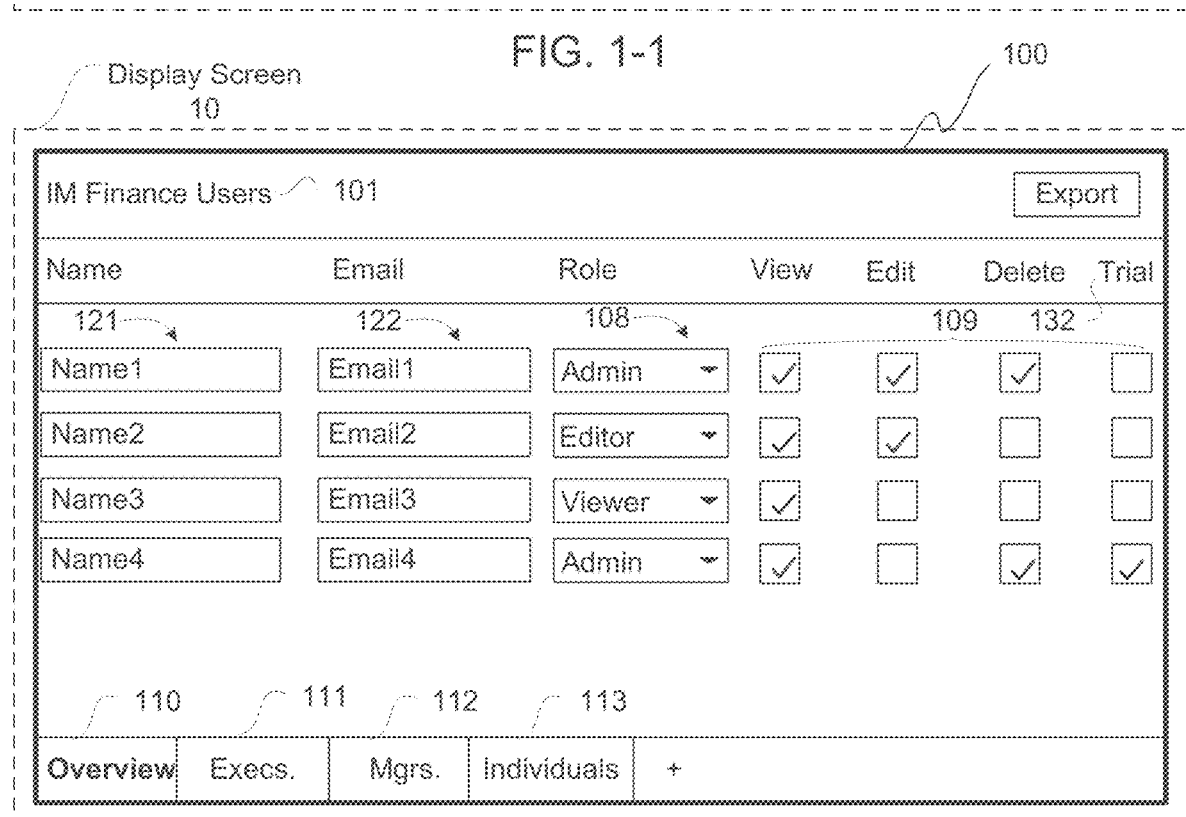

FIG. 1-2 is block/pictorial diagram depicting an example of a filled-out version of a GUI template 100 of FIG. 1-1. FIGS. 1-1 and 1-2 are further described with simultaneous reference to one another.

Each role 108 may include a menu, such as for example a pulldown menu, for selection of a role from a variety of roles. In this example, there are three types of roles, namely administrator or admin, editor, or viewer. However, in another example one or more of these or other types of roles may be used.

Corresponding to each role 108, there may be one or more types of access rights 109 selected. Though four columns for product specific access rights 109 are illustratively depicted, in another example fewer or more than four types of produce specific access rights may be used. Furthermore, through four names are generally depicted, fewer or more than four names may be used.

Returning to FIG. 1-1, in this example Group list area 123 has an overview tab 110 followed by one or more group tabs. In this example, there is a Group A tab 111, a Group B tab 112, and a Group C tab 113. A sign icon 114, such as for example a plus sign icon, may be used to add or subtract group tabs. These tabs 111 through 113 are group sheet placeholders. In this example, a plus sign icon 114 is displayed for adding a group tab. Each tab corresponds to a sheet, such as for a spreadsheet program product. There may be as few as one group sheet placeholder to go with an overview sheet in another example.

Generally, a user is a single person, usually an employee within an organization, with a single login account. Generally, a group is a collection of users selected to be included in a specific category, e.g. an "IM Finance" group. Generally, a role is a name for a collection of specific access rights, e.g. "Editor", "Admin", "Viewer" or "Member". An admin is generally a principal user that assigns access rights and roles to other users, as well as creates and manages groups.

GUI template 100 may provide a predefined configuration or template for an admin or other set up user to assign roles and accesses rights to a group of users. GUI template 100 may be downloaded by an admin. GUI 100 may thus have formatting already done for such an admin, and so such admin may upload their own user list into such template. Once such template is filled out, then such template may categorize itself within a product, as described below in additional detail.

In this example, GUI template 100 is implemented as a spreadsheet template, such as for Excel or another spreadsheet program product. An admin may customize roles in such a sheet. Each application program product may have its own spreadsheet program template for an admin to download (e.g., an inventory management or IM Finance template, or another application program product template). Each spreadsheet template may include predetermined formatting for an admin or another user to fill in with their own data, such as a list of user(s) information.

FIG. 2-1 is a flow diagram depicting an example of a workflow 200 for filling out a GUI template 100. With simultaneous reference to FIGS. 1-1, 1-2 and 2-1, GUI template 100 of FIG. 1-2 and workflow 200 of FIG. 2-1 are further described.

In this example, an Overview sheet 110 is currently being displayed, as generally indicated by bolding such tab. At 201, workflow 200 is started or initiated. At 202, a template may be downloaded for an application program product. A template may be predetermined or predefined for such an application program product.

Optionally, at operation 211 of operation 202, one or more functions may be added to a baseline GUI template 100. An example of a function they may be added is "trial", which is described below in additional detail.

In this example, a setup user downloads an "IM Finance" GUI template 100 for an IM module of a finance program product to import their users' information and format each user's access rights for such application program product. Along those lines, a finance group may have a list of users and corresponding emails. At 203, such list of users and corresponding emails may be imported into such downloaded "IM Finance" GUI template 100. In this example, Name1 through Name4 are imported along with corresponding Email1 through Email4 respectively forming a name list or column 121 and a corresponding an email list or column 122. Additionally, an application product name, such as in this example "IM Finance", may be added to a product name field 101 to go in front of Users. This name may be auto populated responsive to an application program product. Optionally, a setup user can rename this name located in front of Users 101. This name may be created as a filename for a filled-out GUI template 100.

At 204, a setup user may assign roles 108 to users. For example, Name1 and Email1 may be assigned an administrator role in column 108. In this example, Name1 through Name4 are respectively assigned admin, editor, viewer, and admin roles. Notably, there may be more than one of any type of such roles assigned, as in this example there are two administrators.

At 205, access rights 109 are automatically populated responsive to assigned roles at 204. Access rights may be predefined in a GUI template 100 by product for each assignable role. Along those lines, access rights may be product specific, as well as role specific. Each program product may have an associated GUI template 100. Along those lines, in this example an admin role 108 has view/edit/delete access rights 109. Furthermore, in this example, an editor role 108 has view/edit access rights 108, and a viewer role 108 has view access rights 109.

In this example, Name 103, Email 104, Role 106, and access rights (e.g., View, Edit, Delete, and Trial) are all predetermined by a program product for which a GUI template 100 was created. However, in another baseline version of GUI template 100 for a program product, Trial may not be present.

At the bottom of GUI template 100 are tabs 110 through 113 in this example. Tabs 110 through 113 are likewise predetermined by a program product for which a GUI template 100 was created. In this example, GUI template 100 is an excel file, and tabs 110 through 113 are respective "Sheets". In this example, such tabs 110 through 113 are pre-labeled in GUI template 100.

The first sheet is labeled "Overview", followed by "Group A", "Group B", and "Group C", as placeholder text in for sheets to provide context for a user so they can rename such groups sheets. At 206, GUI template 100 may be customized. For example, each sheet in GUI template 100 represents a specific group that a user can create and include a replacement name. In this example, each of Group A through C may be respectively renamed for an "Executives" group, a "Managers" group, and an "Individuals" group.

GUI template 100 may additionally include one or more options or have them added at operation 211. This flexibility allows further addition from a baseline version of GUI template 100. This allows for a global admin to modify a GUI template for each product. For example, if a user wants to join a group for a limited amount of time or a group administrator want to add a user for a limited amount of time, a "trial" period of such group or user may be allowed by a trial access right 132 of access rights 109.

Along those lines, by invoking a trial access right 132, a user may be permitted in a group for a limited amount of time. This is just one example of many examples of added functionalities may be implemented. More generally, GUI template 100 may be changed to option in functionality at operation 211 to a UI of a program product.

Figures 1, 2, 3, 4, 5:
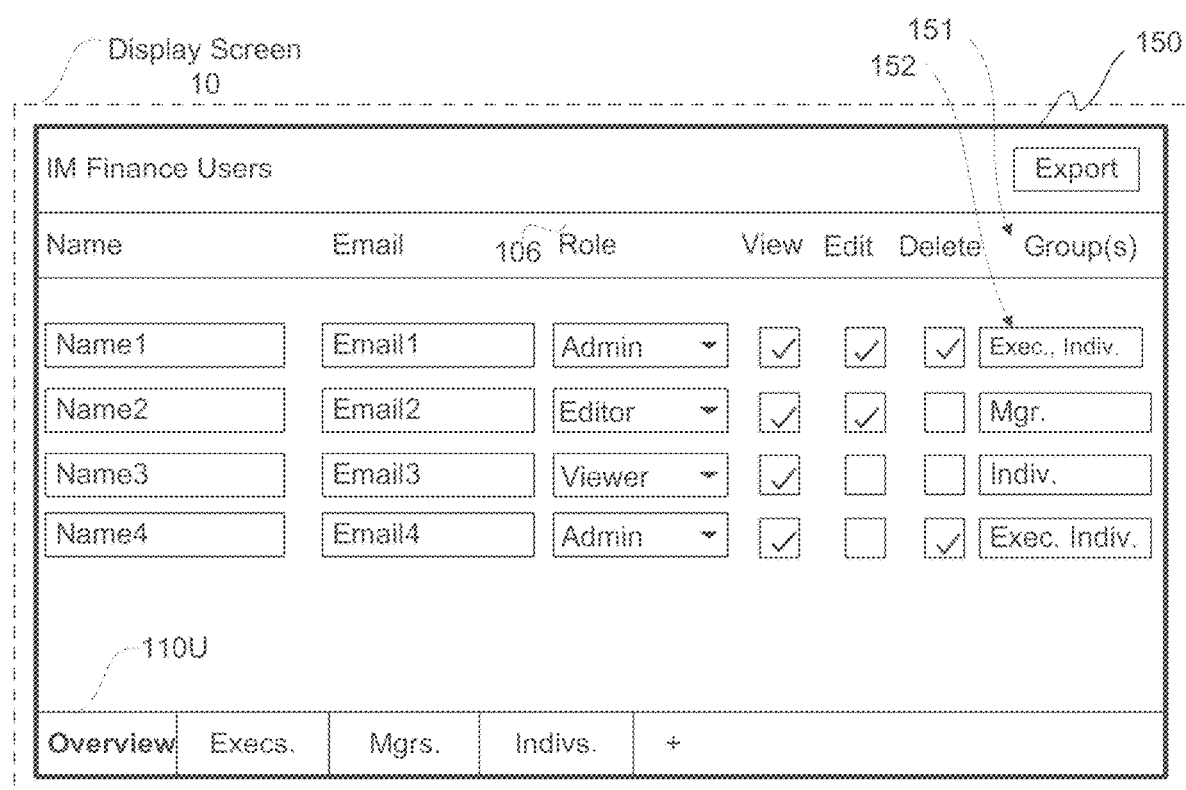
Figures 1, 2:
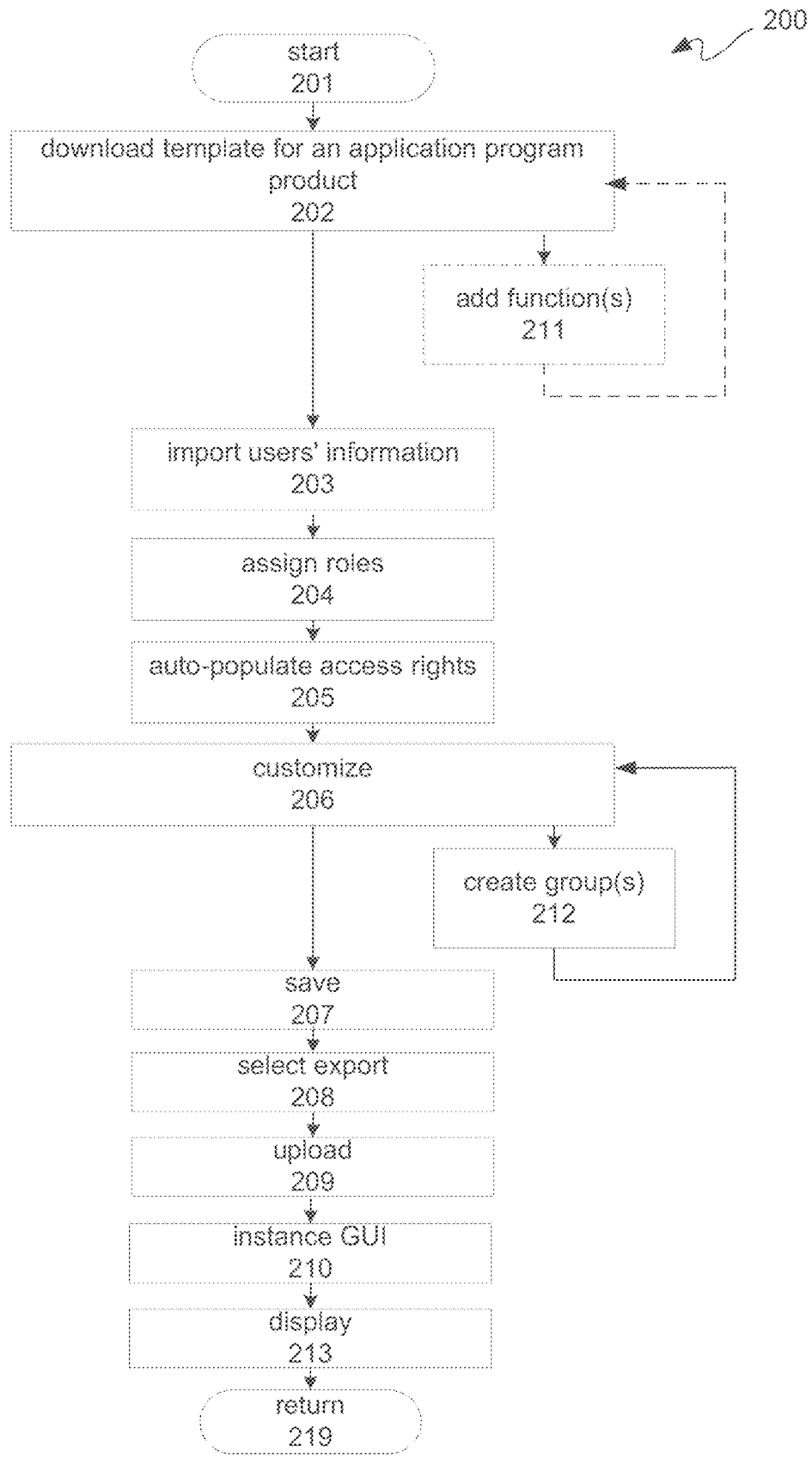
Figure 2:
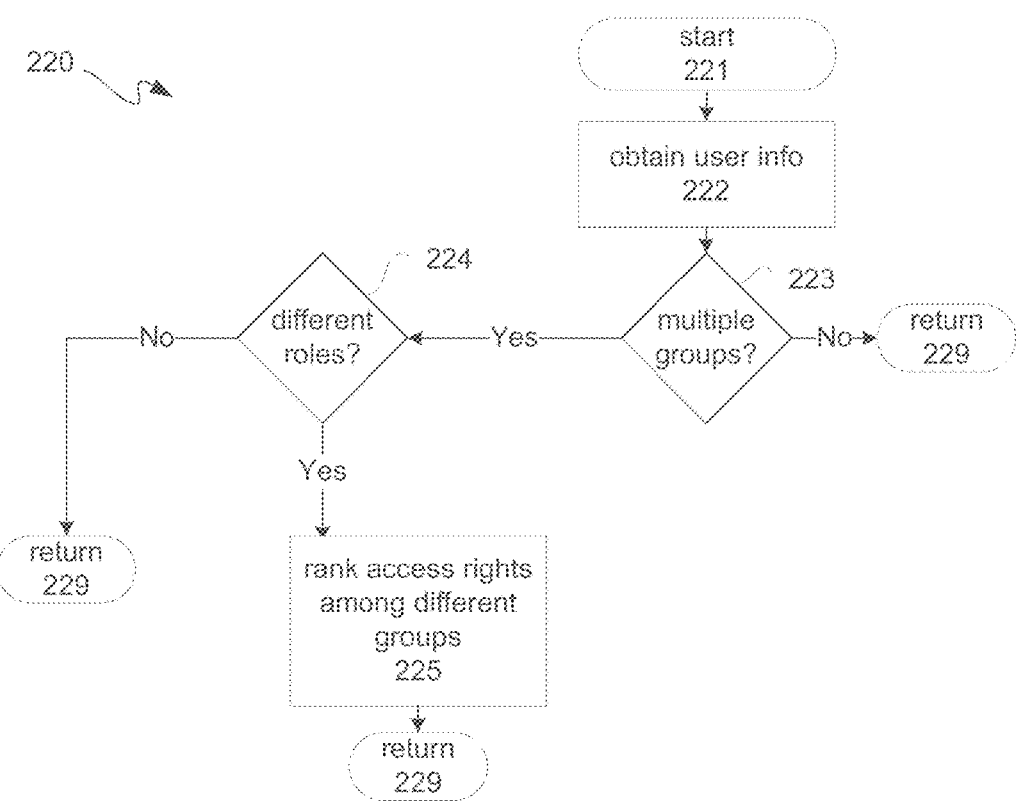
Figures 2, 3:
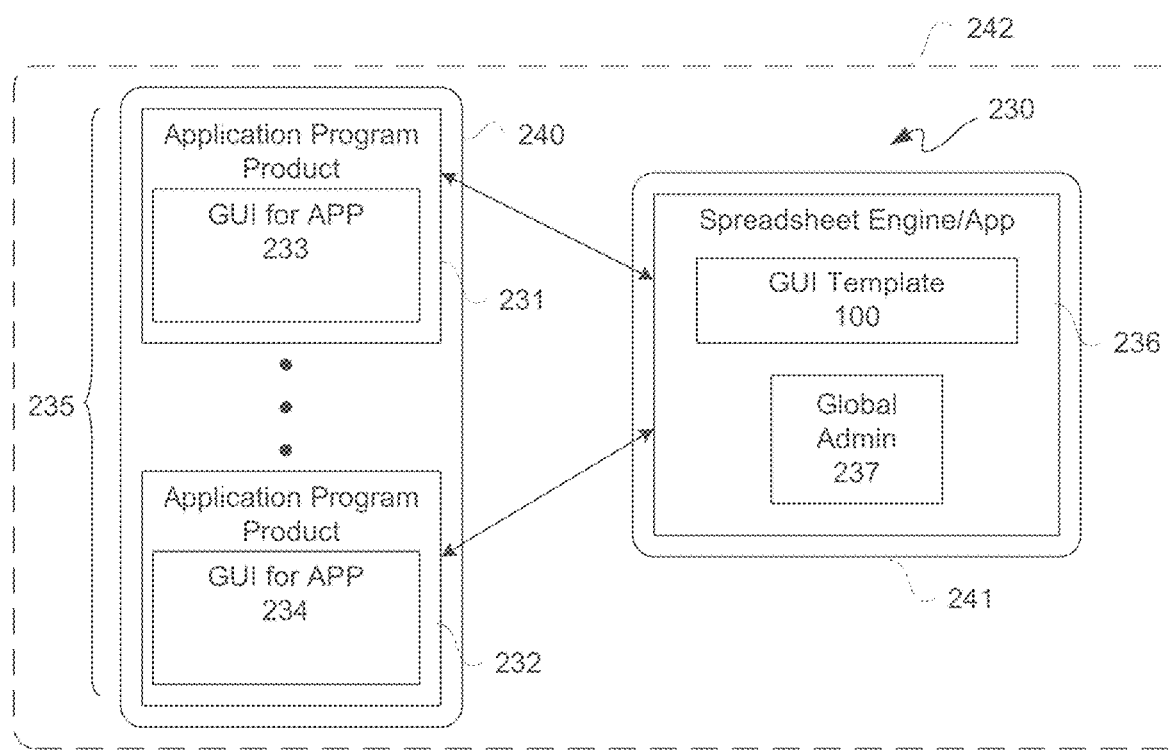
Figures 2, 3:
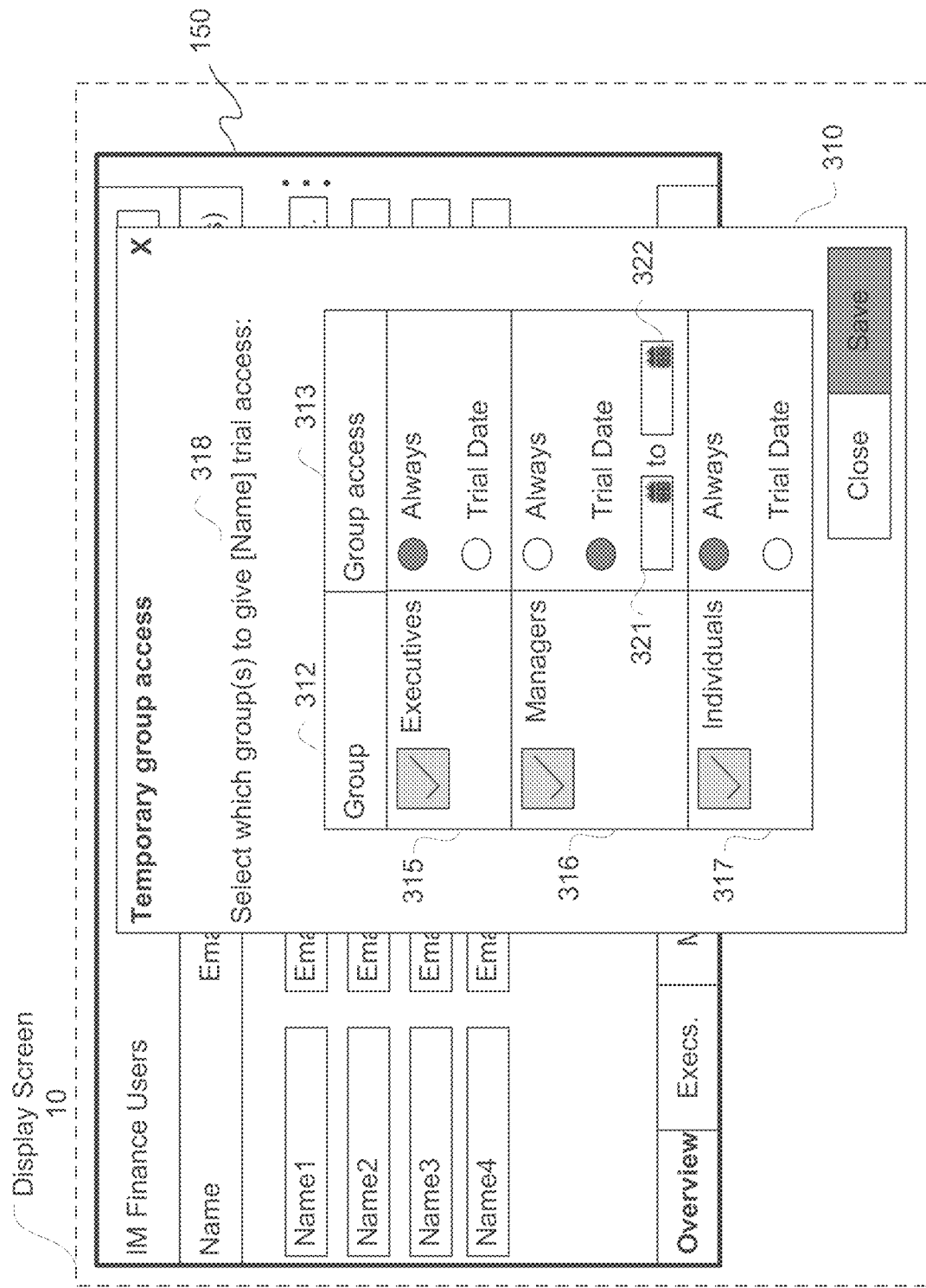
Figure 3:
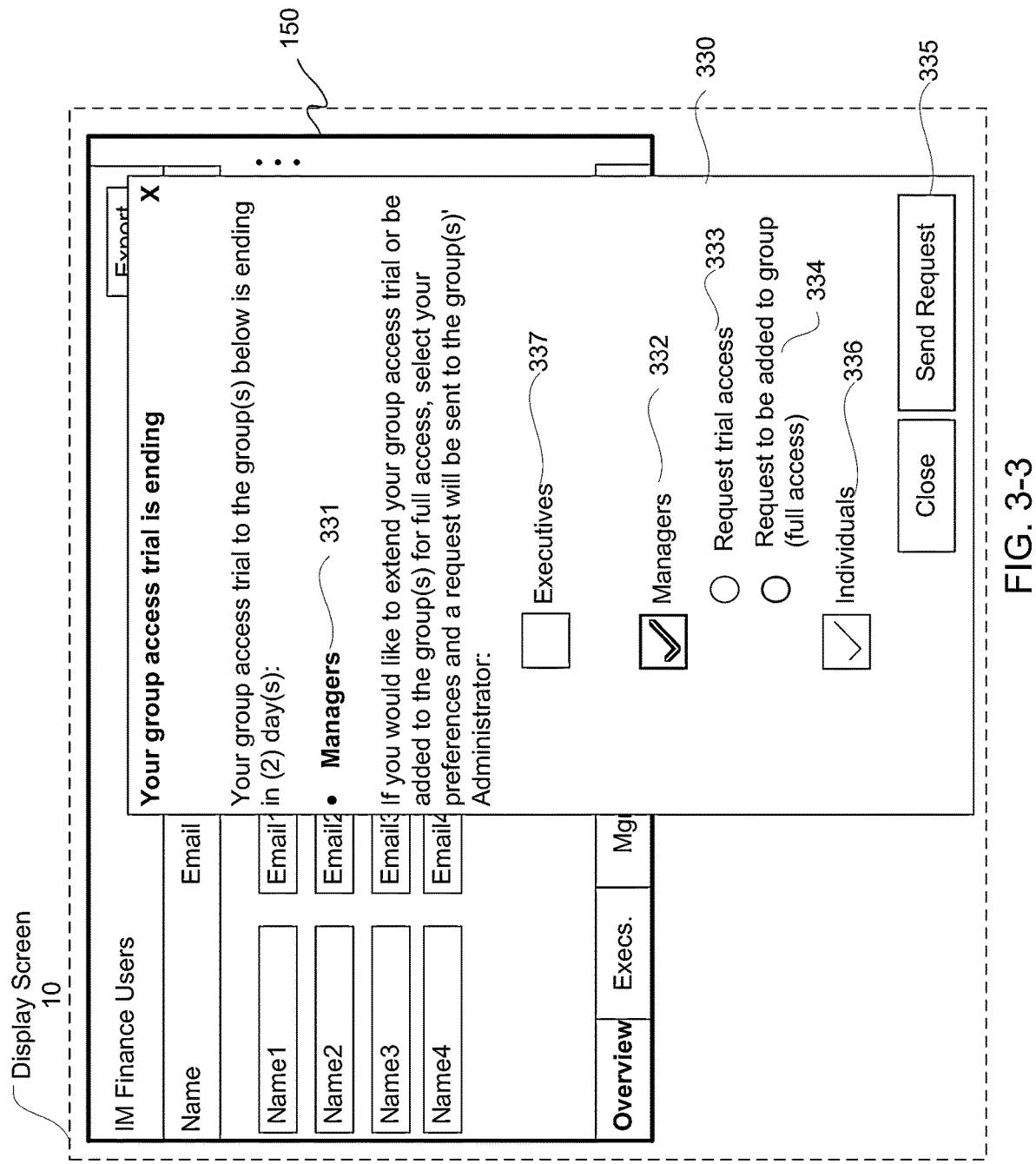
Figure 4:
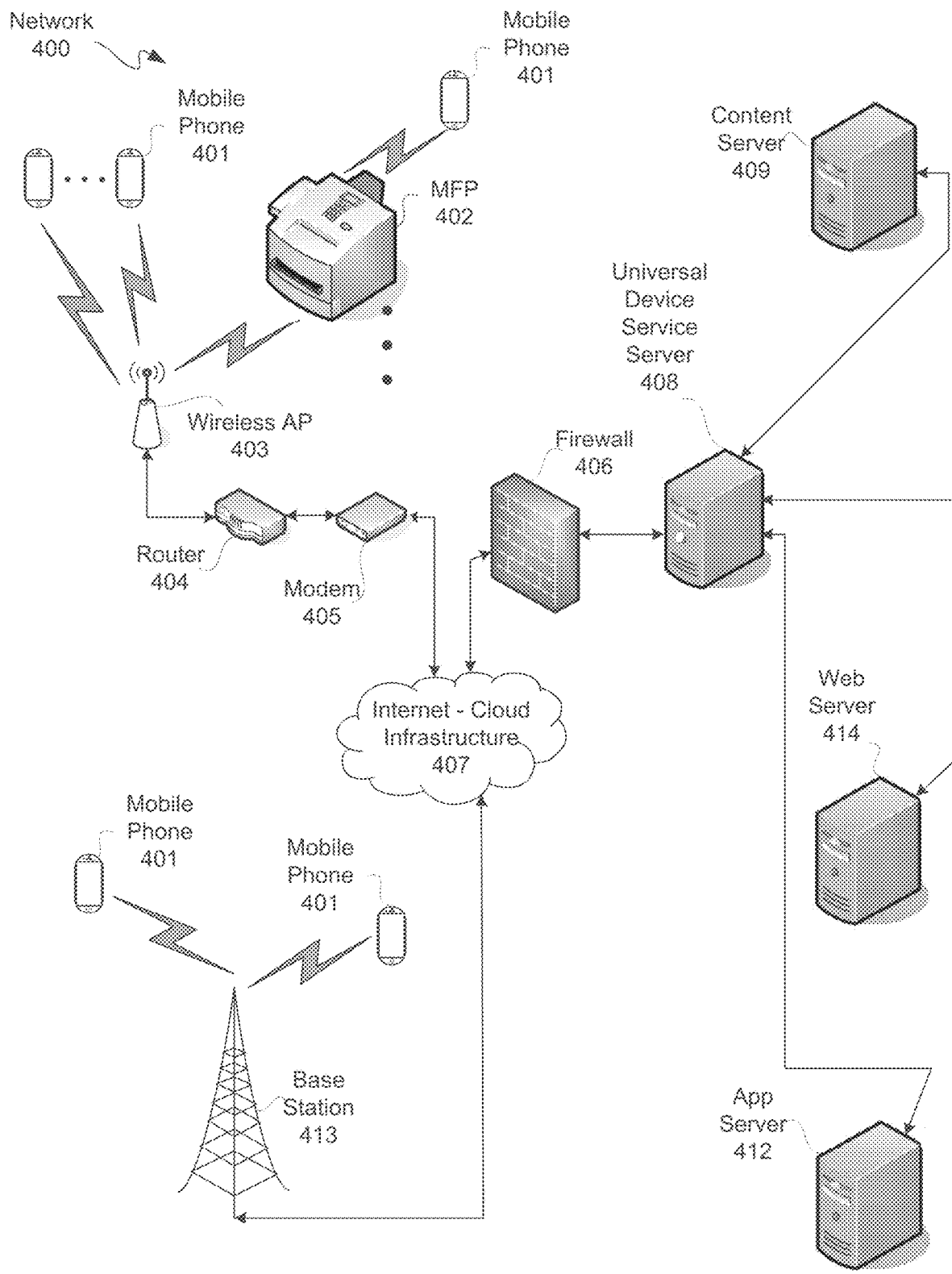
Figure 5:
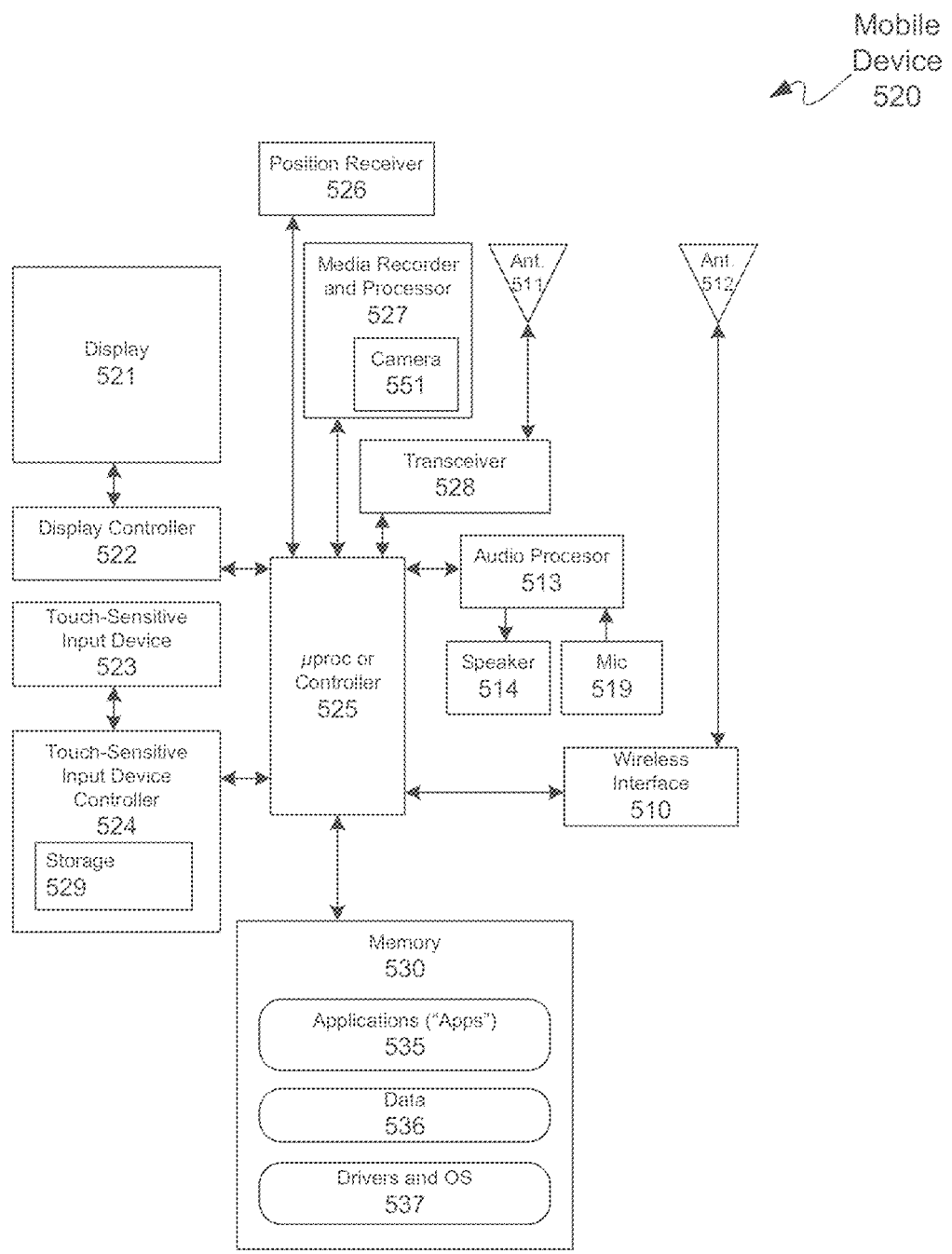

For purposes of clarity by way of example, FIG. 1-3 is a block/pictorial diagram depicting an example of a filled-out version of a GUI template 100 of FIG. 1-2 for an Executives group 111. FIG. 1-3 is further described with simultaneous reference to FIGS. 1-1 through 1-3.

Executives group 111 may be bolded to indicate such group is currently being displayed. In this example, only Name1/Email1 and Name2/Email2 appear as only they are in such Executives group 111. Based on a set of predefined roles to select from by way of pull-down or drop-down menu 131, roles of Admin and Editor have been respectively assigned to Name1 and Name2.

A "Role" column 106 for each user may have predefined roles 108 to select from in a drop-down menu 131. In response to selection of a role 108 for a user, access rights 109 are auto-populated for each corresponding role. Additionally, a role may toggle for a user depending on a group selected. For example, Name1 in an Executives group 111 may be an admin; however, Name1 in a different group may have a different role, as may be seen for example by selecting a different group tab, such as Individuals group tab 113 for example. Along those lines, a user may have different roles or groups across a suite of application program products; or, optionally, a global admin for such a suit of application program products may assign a user same roles or groups across all such application program products of a suite thereof.

For purposes of clarity by way of example, FIG. 1-4 is a block/pictorial diagram depicting an example of a filled-out version of a GUI template 100 of FIG. 1-2 for an Individuals group 113. FIG. 1-4 is further described with simultaneous reference to FIGS. 1-1 through 1-4.

Individuals group 113 may be bolded to indicate such group is currently being displayed. In this example, only Name1/Email1 and Name4/Email4 appear as only they are in such Individuals group 113. Based on a set of predefined roles to select from by way of pull-down or drop-down menu 131, roles of Admin and Viewer have been respectively assigned to Name4 and Name1. Furthermore, in this example, Name4 is an admin under a trial status, and so an admin under a trial status or state may have different access rights 109 than an admin not under a trial state. In this example, Name 4 has view and delete access rights, but not edit access rights as may be present for an admin not under a trial state.

Again, a "Role" column 106 for each user may have predefined roles 108 to select from in a drop-down menu 131. In response to selection of a role 108 for a user, access rights 109 are auto-populated for each corresponding role. Additionally, a role may toggle for a user depending on a group selected. For example, Name1 in an Executives group 111 may be an admin; however, Name1 in a different group may have a different role, as may be seen for example by selecting a different group tab, such as Individuals group tab 113 as in the example of FIG. 1-4. Along those lines, a user may have different roles or groups across a suite of application program products; or, optionally, a global admin for such a suit of application program products may assign a user same roles or groups across all such application program products of a suite thereof.

Returning to FIG. 2-1 with continued simultaneous reference to FIGS. 1-1 through 1-3, after adding users and selecting their roles, an admin or setup user can then select however many rows of users or which users they want to have in a group and copy/paste such selected rows into such "group" sheet to create any one or more group(s) at operation 212 as part of customization at operation 206. In other words, copy/paste causes not just names and emails to appear in a group, but also roles and access rights. Of course, these roles may be changed by an admin in set up or managing a group, as described elsewhere herein.

For example, if a setup user selected two rows of users consisting of Name1 and Name2 respective having an Admins and an Editor role, and copy/pasted such two rows into a selected tab or sheet, which they renamed as "Executives" group in this example, then such a group is created with automatic population of roles. As previously indicated, all "group" sheets may have the same columns header format as an "Overview" sheet.

Because GUI template 100 is built on an spreadsheet program product engine, such as Excel in this example, If a user wants to sort a list to see in total who is an Admin, Editor, or Viewer, for example, a user can select "Sort & Filter" (not shown) on Excel and sort by ascending or descending order.

After the sheets of groups are completed at operation 212, GUI template 100, which in this example is an Excel template, may be saved at operation 207 and exported at operation 208. Saving at 207 may be via a save button provided via Excel, and exporting may be via selection of export button 102. While saving at 207 may include saving a file associated with a completely or partially filled out GUI template 100, saving at 207 may including printing out each sheet of a GUI template 100 with information added thereto, including auto-population of access rights, on a printing device, such as for example a multi-function printer.

Selection of export button 102 causes data and configuration added to or subtracted from a GUI template 100 to be uploaded at operation 209 back into a resident GUI template of a program product, which may be a baseline GUI template 100 for a first upload. Uploading at 209 causes such resident GUI template to be auto-populate with an associated users list and their corresponding roles and groups created by a setup user. After uploading, such application program product for which a template was downloaded at 202 may reflect the same groups, roles, and users as written in such GUI template 100, namely an Excel template in this example. At 210, an admin GUI for group management, as described elsewhere herein, may be instanced with such GUI template 100 within such a program product. At 213, an admin menu, such as described elsewhere herein, of such an admin GUI, may be displayed with a configuration for setting temporary group access within such a program product, for example as described below. At 219, workflow 200 for filling out a GUI template 100 may return to an application program product from whence it was called.

FIG. 1-5 is a block/pictorial diagram depicting an example of a filled-out version of an application program product GUI 150 after upload of a GUI template 100 of FIG. 1-2. FIG. 1-5 is further described with simultaneous reference to FIGS. 1-1 through 1-5.

In this example, an Overview sheet 110U is displayed after upload from an Overview sheet 110 of a GUI template 100. A filled-in GUI template 100 provides a data structure to an application program product to which it is uploaded; however, application program product UI 150 provides an interface to accessing such data structure. In additionally, application program product UI 150 provides additional functionality.

In an application program product UI 150, optional hidden functions that may have been added, such as for example Trial function 132, are not displayed in this Overview sheet 110U. However, in Overview sheet 110U a "Group(s)" column 151 is added to the right after a last access rights column. Group(s) column 151 list each group 151 a corresponding named group user or member is in. For example, Name1 is in an Executives and an Individuals group, and Name 2 is in a Managers group.

By uploading customized user roles, a setup user is empowered with customer a lot of flexibility and ease-of-use for submitting groups and roles into an application program product. By pre-determining a format of a GUI template 100, such as for example an Excel template, with specific access rights per role for an application program product, an application program product may provide structure and constraints for a setup user or customer to easily follow. This allows a customer to generally only focus on data entry within a template, while providing space for a customer to feel in control of edits and group creation before uploading a data loaded template into an application program product.

With a bulk upload of users, assigned roles with predefined access rights per role, and pre-created or created groups of a mix of users with various roles, streamlines workflow 200 for a customer using an application program product while providing customer control in assigning permissions to specific users and groups. For example, a customer can assign an unlimited number of admins if that makes sense for their team, or an unlimited number of editors or viewers or other roles. Furthermore, depending on an application program product, role names may be different with different types of access rights for each role.

Along the above lines, FIG. 3-1 is a block/pictorial diagram depicting an example of GUI 150 of an application program product after invoking an admin menu ("admin popup") 300. For purposes of clarity and not limitation, GUI 150 continues the above example, but other configurations of a GUI in accordance with the description herein may be used as may vary among application program products.

Admin popup 300 is a group administrator control popup, which may be invoked for example by right clicking or otherwise on GUI 150. In admin popup 300 there are four commands in this example; however, in another example these or other commands may be present.

Edit user command 302 is to edit a selected user of a group. Delete user command 303 is to delete a user of a group. Add to group command 304 is to add a user to a group, and if selected from an overview tab, a list of available groups to which such user can be added may be displayed. Lastly, give temporary access command 305 is to temporarily add a user to a group, such as for a trial access right as previously described. In this example, give temporary group access command 305 is selected, as indicated by highlighting thereof.

Again, a customer or setup user may create an unlimited number of groups for their team. Moreover, a customer may copy/paste the same one or more selected users across multiple groups in creating groups even after uploading a GUI template 100 to provide GUI 150. A customer is not restricted when assigning users to groups; for example, a user Name1 can be in both an "Executives" group and an "Individuals" group, where a customer may copy/pasted user Name1 information into both groups' sheets within a GUI template 100, such as for example an Excel template. In this example, both groups appear in a group field 301 for such user Name1.

FIG. 2-2 is a flow diagram depicting an example of an access limitation flow 220. If a user has differing roles in multiple groups, they may likewise have differing access rights between groups that they are in.

At 221, access limitation flow 220 may be initiated. At 222, information for a user may be obtained, where such information is contained within a GUI 150.

At 223, it may be determined if a user is in different groups. If a user is only in one group, then access limitation flow 220 may return at 229. If, however, at 223 it is determined that a user is in different groups, then at 224 it may be determined if such a user's roles within any of those groups is different.

For example, a user's role in one group may allow access to a feature, such as for an "Accounting" folder in an IM continuing the above example. However, in another group, a user may not have access to such feature.

If at 224 it is determined that a user has the same role in each group to which they belong, then access limitation flow 220 may return at 229. If, however, at 224 it is determined that a user has different roles in at least two group instances ("groups") to which they belong, then at 225 such user's access rights may be ranked. This ranking may be among different groups to which such user has different access rights. This ranking may be a sort of access rights from highest to lowest roles, namely highest to lowest access rights.

For example, suppose a user Name1 is an admin role in an Executives group and a viewer role in an Individuals group, then user Name1 may in such Executives group may give access to a feature, such as an Accounting folder in IM for example, to members of such Executives group. However, user Name1 would not be able to give others in Individuals group access to such feature, where such others are not in such Executives group. Because user Name1 is in such "Executives" group, they are granted access to such feature, even though they are also part of a restricted "Individuals" group with respect to such feature, such as for example an Accounting folder. Accordingly, ranking at 225 may restrict access, so Name1 is not allowed to give access to those not entitled to such access. After ranking at 225, access limitation flow 220 may return at 229.

FIG. 2-3 is a block diagram depicting an example of a suite of applications 235 in a digital content management system 230. In this example, suite of applications system 230 includes multiple application program products of a suite 235 thereof. In another example, a set of different application program products or APPs may be present, or a combination of a suite of APPs and disparate APPs.

In this example, spreadsheet engine/app 236 is operated on a computer which is a cloud-based server 241. Furthermore, in this example, each APP of suite 235 is operated or executed on a computer which is an application server 240 optionally of a cloud-based network 242 including cloud-based server 241. In other examples, other types of network topologies or use cases may be used. For example, cloud-based server 241 may be accessed from a mobile device, such as for example a mobile phone, for operation of GUI template 100, and spreadsheet engine/app 236 may be a separate backend app, not generally accessible as a spreadsheet app of an application server.

Each APP, such as for example APPs 231 and 232, includes a GUI for such APP, namely GUIs 233 and 234, respectively. Each APP may be operated on a computer, an example of which is described below. APPs 231 and 232 may be put into communication with a spreadsheet engine or app 236, which too may be operated on a same or different computer than suite 235, such as in a network an example of which is described below.

In this example, a GUI template 100 is present in spreadsheet engine or app 236. However, in another example, an initial GUI template 100 may be downloaded from an APP, such as APP 231 or 232 of suite 235 for example. Once populated with data and other information, including selection of roles, as previously described, GUI template 100 may be uploaded to APPs of suite 235. In this example, one GUI template 100 with information may be uploaded across a suite 235 of APPs; however, in another example information of a GUI templated may be different as between two or more APPs of a suite.

Roles can be different in different groups; can be product specific so not necessarily across all APPs of a suite, or can be the same across all APPs of a suite. Along those lines, a "Global" admin module 237 may be present for operation of GUI template 100 in spreadsheet engine or app 236.

In this example, an administrator may use Global admin module 237 across all APPs of suite 235. For example, from a Global admin module 237 a GUI template 100 may be processed for importation of users' information, assignment of roles and creating of groups, including auto-population of access rights in such assignment of roles. Further, from such Global admin module 237, such a filled-out and auto-populated GUI template 100 may be uploaded to each APP of a suite 235. In another example, APPs may be created to allow customers to have full access to groups and users' roles modularly, rather than globally, to create a look and feel of full module-level granular control over who has access to what documents, folders, records, or other items.

By eliminating the hassle of entering user data and permissions one by one, a user can save time in the beginning with a GUI template 100, such as an Excel template, formatted to be for efficient data entry. Subsequent changes to information input via such a GUI template 100 for any further customization can happen easily in APPs of suite 235 without having to go back and forth to reupload a GUI template 100 anew, which can be useful each time an update is to be performed. However, a user may download a GUI template 100 with current information and then perform additional changes for subsequent reupload or upload anew with changes.

Accordingly, a customer may have an ability for granting multiple options with flexibility, autonomy, and a sense of control over their data and permissions.

Returning to FIG. 3-1, there may always be at least one assigned admin role for each application program product GUI 150. This allows a customer to have control over other users' permissions and product-specific access rights. After uploading a GUI template 100 with customized user roles and groups, such user roles and groups may be reflected within an application program product therefor.

As indicated with admin popup 300, GUI 150 of an application program product allows for post-upload of edits to a user/group, adding/deleting users to/from a group, and modifying role and/or group assignments for user, among other changes. Accordingly, a customer does not have to re-upload a completed GUI template 100 to make changes, but rather can directly make changes within an application program product after an initial upload of GUI template 100.

FIG. 3-2 is a block/pictorial diagram depicting an example of GUI 150 of an application program product after invoking an admin popup 310. FIG. 3-2 is further described with simultaneous reference to FIGS. 3-1 and 3-2.

After a GUI template 100 list of users is uploaded, GUI 150 list of users can be used to add other users, such as via an options menu button to the right of each user, to be able to add a user to a group, or to grant temporary access to a group (if a user has an admin role. For temporary access, temporary access menu, which in this example is a popup menu, ("temporary access popup") 310 may be in response to selection of give temporary group access command 305.

Temporary access popup 310 may display of a user name 318 of a selected user. A group column 312 of temporary access popup 310 may list available groups for such selected user, such as for example an Executives group 315, a Managers group 316, or an Individuals group 317.

A group access column 313 of temporary access popup 310 may list types of temporary access, as well as permanent access, to a corresponding listed group in group column 312. In this example, types of temporal access are "Always" and "Trial Date". If "Always" is selected, then a selected user is a permanent member of a corresponding group, unless later changed by an admin. If "Trial Date" is selected, then a start date range window or field 321 and an end date range window or field 322 popup for input of corresponding dates.

FIG. 3-3 is a block/pictorial diagram depicting an example of GUI 150 of an application program product after invoking a user menu, which in this example is a popup menu, ("user popup") 330. FIG. 3-3 is further described with simultaneous reference to FIGS. 3-1 through 3-3.

User popup 330 may be set to automatically popup near in time to a trial access or a trial access right to a group coming to an end. In this example, two days prior to a trial access right ending to a Managers group 331, a user popup 330 is displayed. If a user wants to extend a trial access of a group, they can send a request by selecting send request button 335, which sends a to their administrator to request an extension or be granted full access. Along those lines, a Managers group selection 332 may be automatically selected for an expiring trial access, and a user may select under Managers group selection 332 either request trial access 333 or request to be added 334. The latter choice is for adding a user to such group with full access, subject to an assigned role. The former choice is for another trial period.

Group(s) to which a user is already in, as well as group(s) to which such user is currently not in, may additionally be displayed. In this example, an Executives group 337 is unchecked, as such a user is not in such group, and an Individuals group 336 is check, as such a user is already in such group. If a user wants to be added to a group, a user can select such a group (or groups) they would like access to and send a request to their administrator via send request button 335.

One contrast to some digital document management systems, such as Sharepoint and Box for example, after a GUI template is uploaded within an application program product, then different Groups are shown in accordance with such upload GUI template. Another contrast to some digital document management systems is granularity to create roles and groups at the same time and in one screen. Furthermore, copy/paste may be used to create groups. Avoidance of multiple steps for such creation in different screens enhances clarity. Additionally, same roles for multiple application program products may be present, so an administrator can manage user roles more easily by not having to understand many varied roles. It is easy to be confused for different roles, groups, hierarchy, or other differences across application program products.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WI-FI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
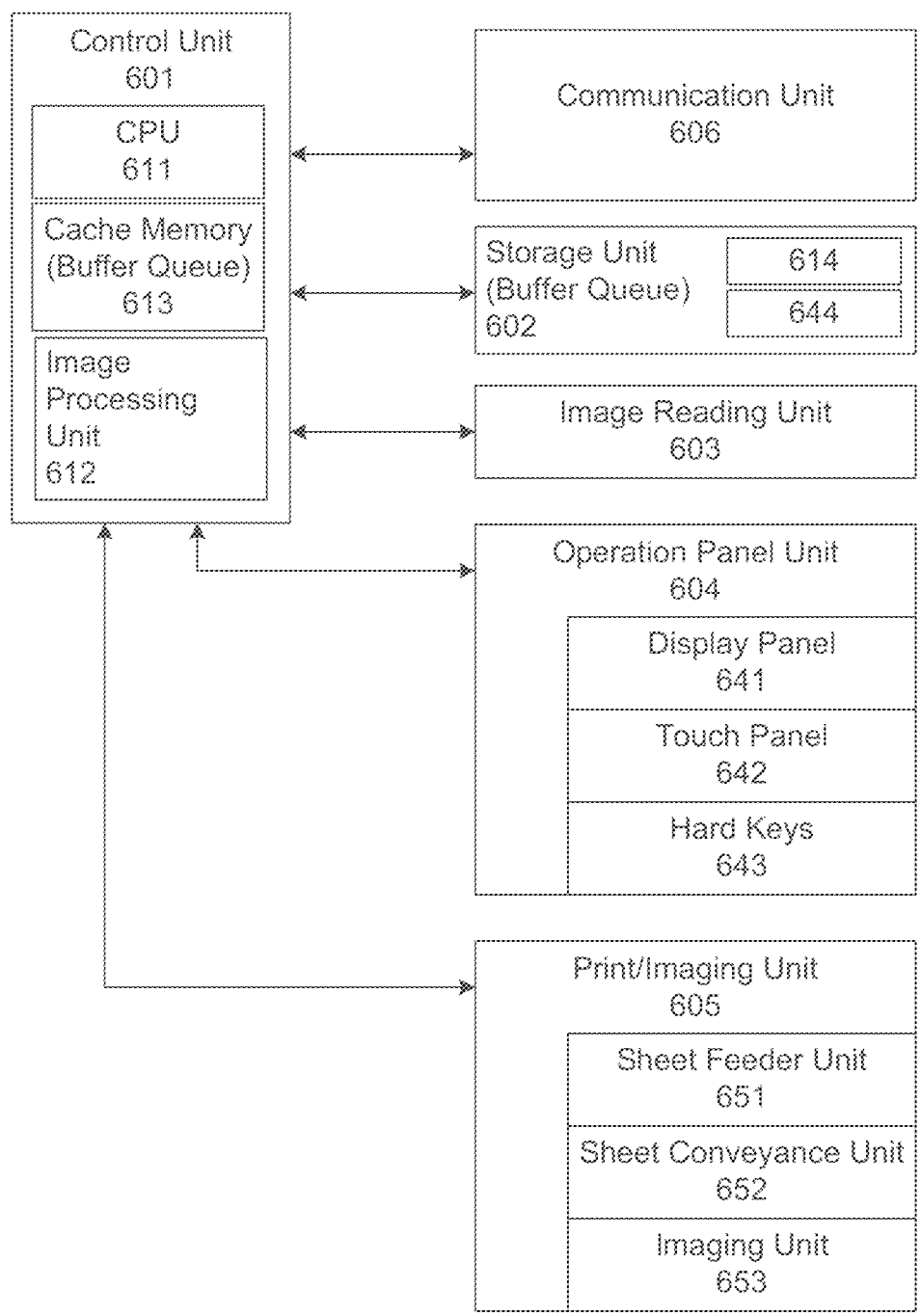
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices. Communication unit 604 may include two or more local interfaces. Control unit 601 may include a CPU 611, an image processing unit 612, and cache memory 613.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
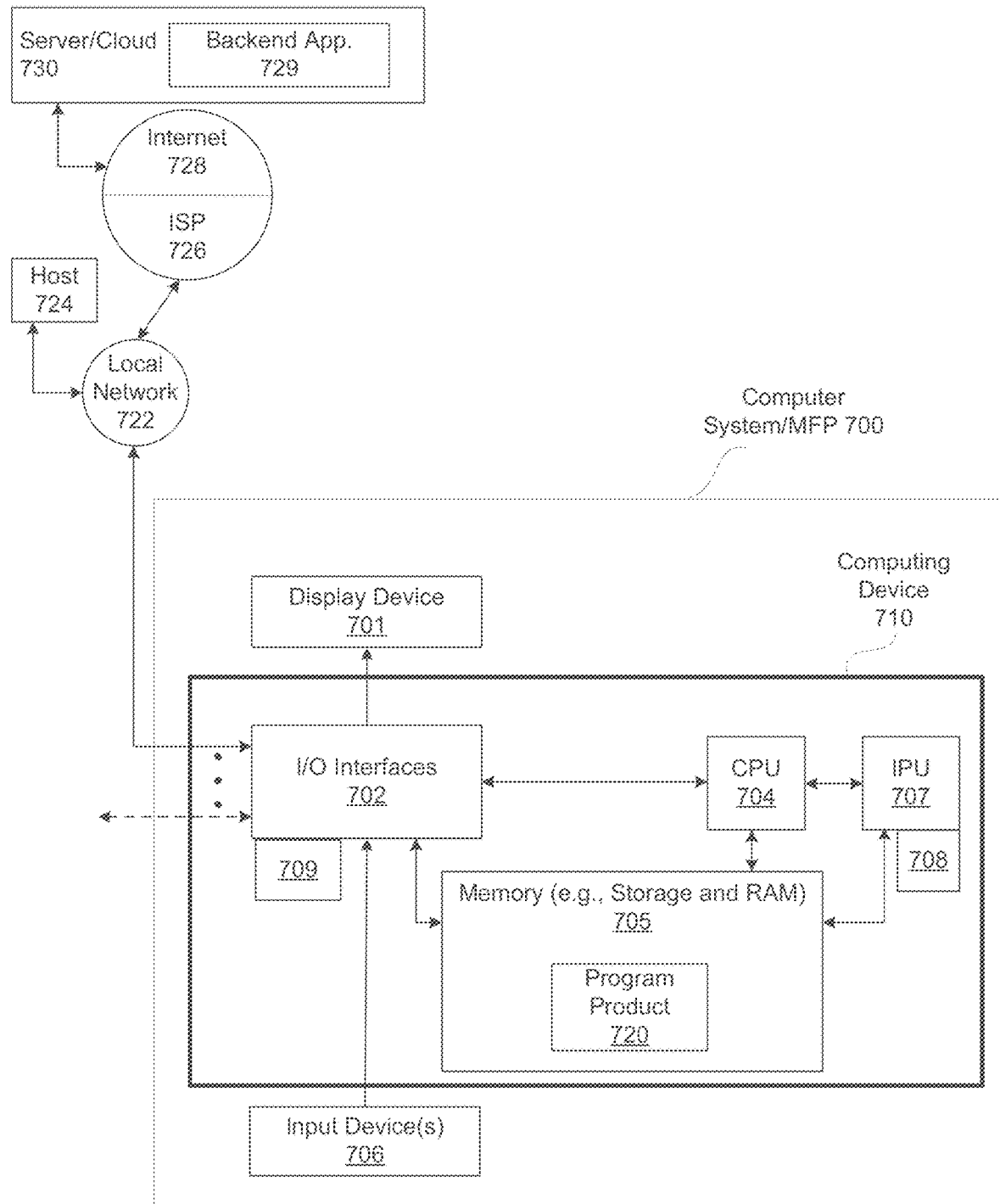
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WI-FI (such as IEEE 802.11a, IEEE 802.11b, IEEE 802.11g and/or IEEE 802.11n), Bluetooth, Wi-MAX, voice over Internet Protocol (VOIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WI-FI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for a digital content management system, comprising:
   providing a downloadable template for an application program product to a spreadsheet engine running on a computer;
   importing information of users of the application program product into the template;
   assigning roles from a predefined set of the template;
   automatically populating the template with predetermined access rights for each of the roles assigned;
   creating groups using the information imported in association with the roles and the access rights therefor;
   wherein the template is a graphical user interface template;
   uploading the template with the information imported in association with the roles and the access rights therefor to the application program product;
   obtaining the information imported in association with the roles and the access rights therefor for a user;
   determining whether the user is in multiple instances of the groups;
   responsive to the user being in the multiple instances, determining whether the user has different roles in the multiple instances; and
   responsive to the user having different roles, ranking access rights for the multiple roles in the multiple instances.

2. The method according to claim 1, wherein:
   the computer is a cloud-based server; and
   the application program product is executed on an application server of a cloud-based network including the cloud-based server.

3. The method according to claim 1, wherein the user is of the users.

4. The method according to claim 1, further comprising, after the uploading, adding the user to the multiple instances with the different roles thereof.

5. The method according to claim 1, wherein the application program product is one of a suite of application program products.

6. The method according to claim 5, wherein the spreadsheet engine includes a global admin module.

7. The method according to claim 6, further comprising:
   accessing the global admin module for the importing and the assigning, and the creating; and
   uploading the template with the information imported in association with the roles and the access rights therefor to each of the application program products of the suite initiated from the global admin module.

8. The method according to claim 7, further comprising printing out sheets forming the GUI template with the information imported in association with the roles and the access rights therefor for each of the groups, wherein each of the groups is represented as a separate one of the sheets.

9. A system, comprising:
   a computer having:
      a memory configured to store program code;
      a processor coupled to the memory; and
      wherein, in combination and response to executing the program code, the computer is configured to initiate operations for implementing a process for digital content management, the process including:
         providing a downloadable template for an application program product to a spreadsheet engine running on the computer;
         importing information of users of the application program product into the template;
         assigning roles from a predefined set of the template;
         automatically populating the template with predetermined access rights for each of the roles assigned;
         creating groups using the information imported in association with the roles and the access rights therefor;
         wherein the template is a graphical user interface template;
         uploading the template with the information imported in association with the roles and the access rights therefor to the application program product;
         obtaining the information imported in association with the roles and the access rights therefor for a user;
         determining whether the user is in multiple instances of the groups;
         responsive to the user being in the multiple instances, determining whether the user has different roles in the multiple instances; and
         responsive to the user having different roles, ranking access rights for the multiple roles in the multiple instances.

10. The system according to claim 9, wherein:
    the computer is a cloud-based server; and
    the application program product is executed on an application server of a cloud-based network including the cloud-based server.

11. The system according to claim 9, wherein the user is of the users.

12. The system according to claim 9, wherein the application program product is one of a suite of application program products.

13. The system according to claim 12, wherein the spreadsheet engine includes a global admin module.

14. The system according to claim 13,
accessing the global admin module for the importing and the assigning, and the creating; and
uploading the template with the information imported in association with the roles and the access rights therefor to each of the application program products of the suite initiated from the global admin module.

* * * * *